(12) United States Patent
Lyras

(10) Patent No.: US 8,771,040 B1
(45) Date of Patent: Jul. 8, 2014

(54) MOBILE ABRASIVE BLASTING MATERIAL SEPARATION DEVICE AND METHOD

(76) Inventor: Gus Lyras, Lowellville, OH (US)

(*) Notice: Subject to any disclaimer, the term of this patent is extended or adjusted under 35 U.S.C. 154(b) by 439 days.

(21) Appl. No.: 13/136,752

(22) Filed: Aug. 10, 2011

(51) Int. Cl.
*B24C 9/00* (2006.01)

(52) U.S. Cl.
USPC .................................. 451/88; 451/87; 451/89

(58) Field of Classification Search
CPC ............ B24C 3/06; B24C 3/065; B24C 9/003
USPC .......................................... 451/60, 87, 88, 89
See application file for complete search history.

(56) References Cited

U.S. PATENT DOCUMENTS

| | | | |
|---|---|---|---|
| 2,810,991 A | 10/1957 | Mead et al. | |
| 2,935,820 A * | 5/1960 | Mead | 451/88 |
| 3,934,374 A | 1/1976 | Leliaert | |
| 4,156,600 A * | 5/1979 | Jacobson | 55/285 |
| 4,449,331 A | 5/1984 | MacMillan | |
| 4,646,482 A * | 3/1987 | Chitjian | 451/87 |
| 4,773,189 A | 9/1988 | MacMillan et al. | |
| 4,943,368 A * | 7/1990 | Gilbert et al. | 209/2 |
| 5,185,968 A * | 2/1993 | Lyras | 451/38 |
| 5,257,479 A * | 11/1993 | Swain | 451/92 |
| 5,468,174 A * | 11/1995 | Bachand et al. | 451/75 |
| 5,520,288 A | 5/1996 | Drenter et al. | |
| 5,695,385 A | 12/1997 | Bachand et al. | |
| 5,799,643 A * | 9/1998 | Miyata et al. | 125/21 |
| 5,928,719 A * | 7/1999 | Mishima et al. | 427/180 |
| 6,161,533 A * | 12/2000 | Katsumata et al. | 125/21 |
| 6,514,128 B1 * | 2/2003 | Lyras | 451/88 |
| 7,261,617 B1 * | 8/2007 | Kim et al. | 451/38 |

* cited by examiner

*Primary Examiner* — Lee D Wilson
*Assistant Examiner* — Tyrone V Hall, Jr.
(74) *Attorney, Agent, or Firm* — Harpman & Harpman

(57) ABSTRACT

The process and apparatus for mobile separation and recovery of used abrasive blasting material from a work site. Entrained contaminants within used blast material are removed by a self-contained mobile platform process using multiple stage cleaning system including dual cyclonic separation, multiple stage dust filters with airwash and vibratory separation in a flow through containment and blast media separation process.

5 Claims, 5 Drawing Sheets

MOBILE ABRASIVE BLASTING MATERIAL SEPARATION DEVICE AND METHOD

BACKGROUND OF THE INVENTION

1. Technical Field

This invention relates to devices and process to separate and recycle abrasive steel blast material from entrained contaminants including dust, paint, and rust encountered during use to clean and prepare a variety of surfaces in the industry.

2. Description of Prior Art

Prior art devices and processes have used a variety of fixed and mobile separation apparatus that clean and separates waste material from the shot blast and recycles for reuse. Examples of prior art patents can be seen as follows: U.S. Pat. Nos. 2,810,991, 3,716,941, 3,934,374, 4,449,331, 4,773,189, 4,943,368, applicant's U.S. Pat. Nos. 5,185,986, 5,468,174, 5,520,288, 5,695,385, and 6,514,128.

In U.S. Pat. No. 4,773,189 a separation system is disclosed for polymer blasting media which is cited to show multiple tasks separation system in which contaminated blast products are collected, processed and reused in a continuous manner. The hazardous contaminates being directed to separate disposable storage units within the process.

U.S. Pat. No. 3,716,946 uses a recirculation close system with air separation as the initial separation with a secondary magnetic separator for removal of ferrous shot from the remaining non-ferrous contaminates.

U.S. Pat. No. 4,449,331 shows shot blasting machinery used in communication with a blast cabinet module. The device is characterized by a feed and lift conveyor recirculating system in communication with the blast cabinet for transportation of spent contaminated shot to the top of a vertical separation stack.

U.S. Pat. No. 4,943,368, a non-metallic abrasive blasting material so recovering process is disclosed having multiple steps of size classification, ferro-magnetic separation, gravity separation, electrostatic separation which is used in separation of non-conductive paint from conductive blasting media.

U.S. Pat. No. 3,934,374 a sand blast reclamation system is disclosed using an airwash separator feeding a blast wheel. Contaminated air is directed to a fabric dust collector for filtration. A sand separator is positioned above the magnetic separator supplying usable sand back to the blast wheel via an internal elevator belt.

U.S. Pat. No. 2,810,991, an abrasive blasting apparatus is disclosed that provides for a movable self-contained blasting and separation unit that recovers the spent contaminated shot as it is used and recirculates same through a separation process. The separator uses an air driven grit reclaimer in combination with a transfer chamber.

In applicant's U.S. Pat. No. 5,185,968 a mobile separation system is disclosed wherein a multi-step magnetic and airwash separation is used.

U.S. Pat. No. 5,468,174 is directed to a recyclable abrasive blasting system having a classifier with auger screen separators and airwash.

U.S. Pat. No. 5,520,288 claims an abrasive grit material recovering system having a rotary screen separator, a magnetic separator, and an airwash on a mobile platform.

U.S. Pat. No. 5,695,385 shows a recyclable abrasive blasting system method using multiple auger screen separation and interconnected airwash to achieve particle separation.

Applicant's U.S. Pat. No. 6,514,128 discloses a separating abrasive blasting media from debris using a rotary drum separator with different size gradation interior surfaces.

SUMMARY OF THE INVENTION

A compact self-contained and powered low site impact mobile apparatus and system for separation of spent abrasive steel blasting shot from entrained contaminants using a multi-step and station material treatment having dual cyclonic stage separation and independent dust retention with inline mechanical and airwash material separation treatment. Retained, cleaned and recovered abrasive blasting media in transitional storage for direct use on site supply.

DETAILED DESCRIPTION OF THE INVENTION

Figure 1:
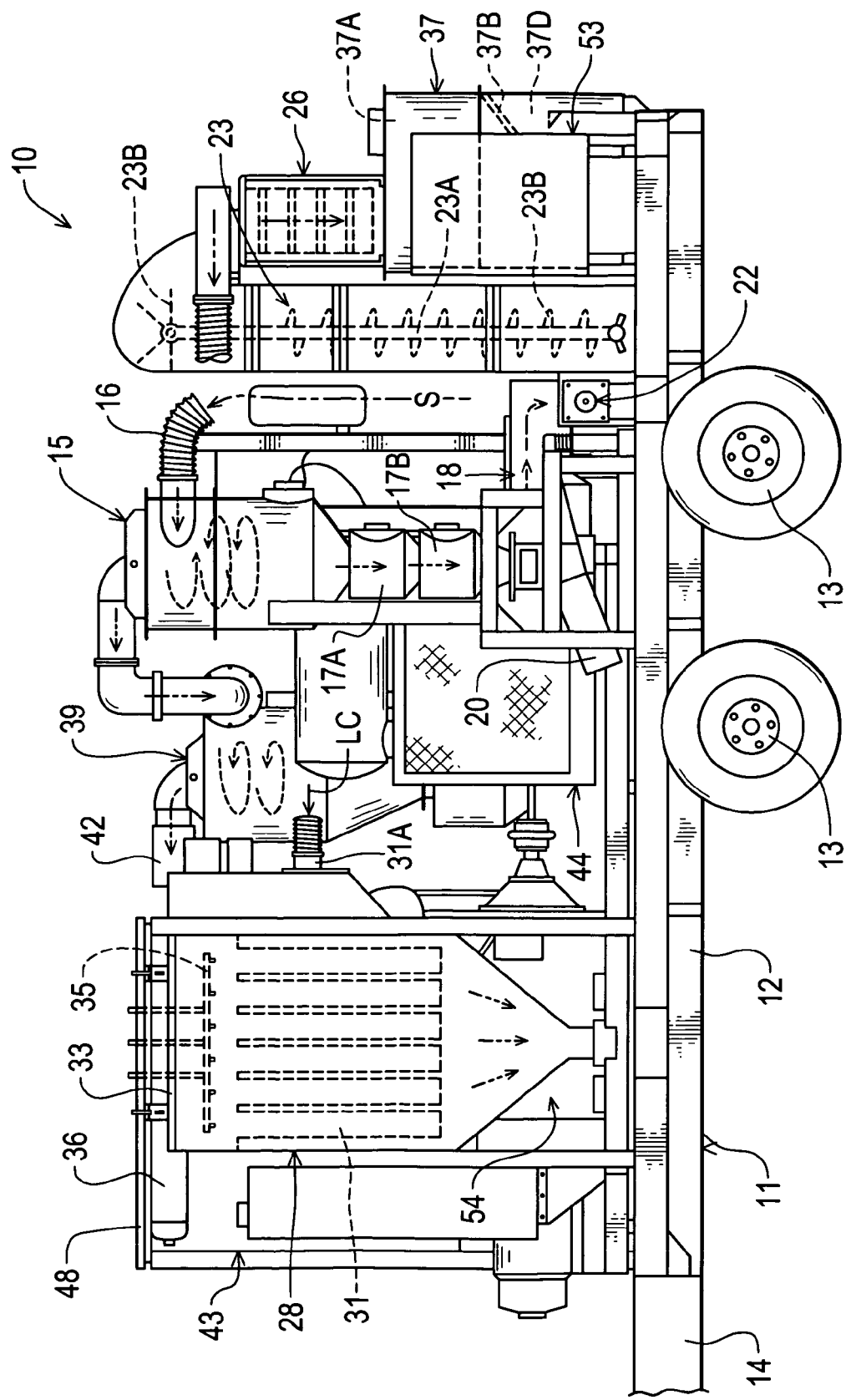
FIG. 1 is a side elevational view of the compact mobile separator apparatus and method of the invention.
Figure 2:
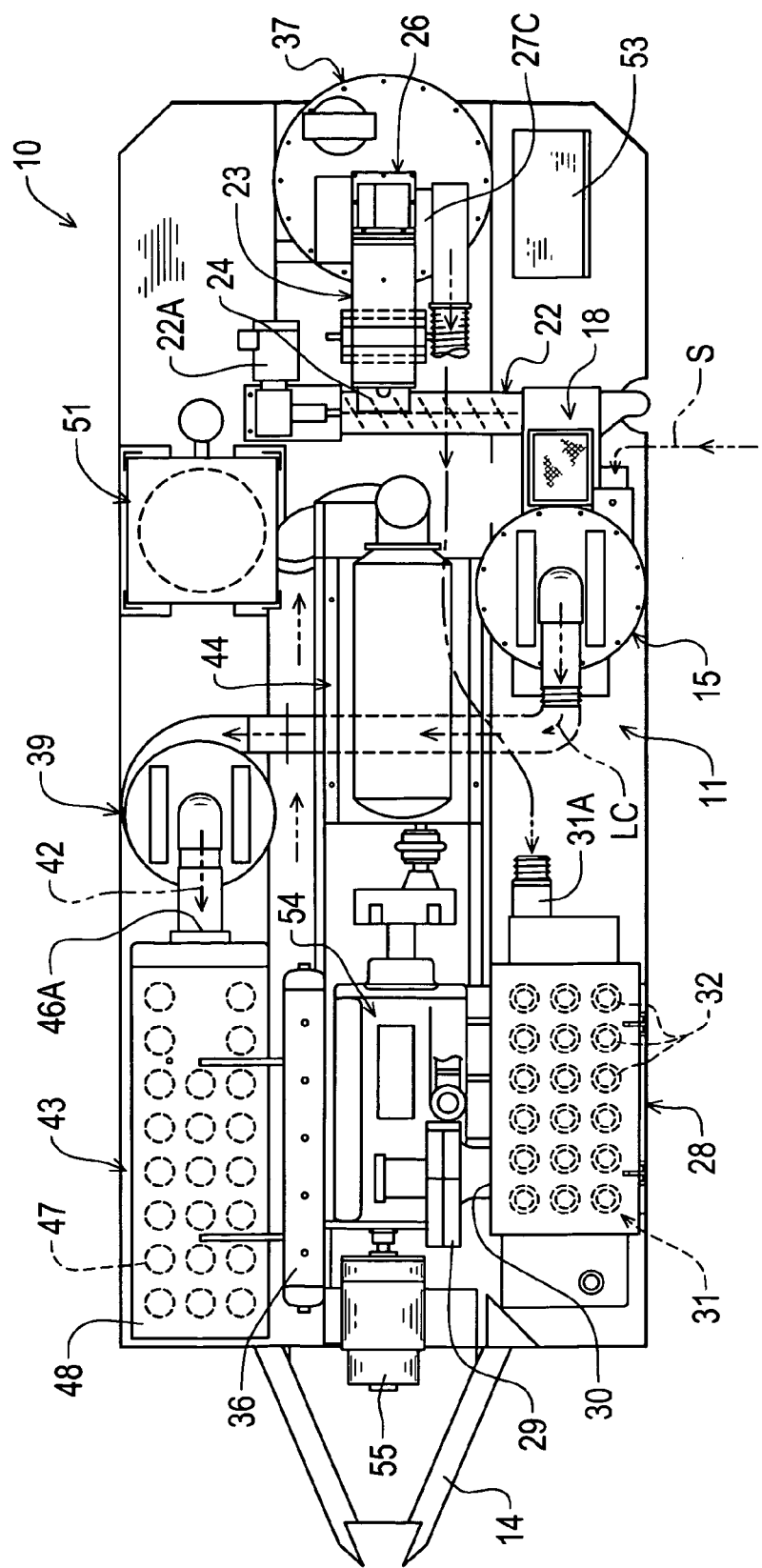
FIG. 2 is a top plan view thereof.

A process and mobile separation apparatus for separation and recovery of used steel blasting shot material S can be seen in FIGS. 1 and 2 of the drawings. The mobile separation apparatus 10 is self-contained on a wheeled trailer 11 having a support frame 12 with dual wheel axle assemblies 13 and a hitch portion 14. The separation apparatus 10 is integrally secured on the trailer 11 allowing for mobile site specific positioning not available to large trailer separators for improved access and usability in the field. The separation apparatus 10 of the invention has an initial cyclonic air separator 15 that receives initially the contaminated abrasive blasting material CABM via a transport vacuum hose 16 from the work site as will be well understood by those within the recycle separation art. The primary cyclonic air separator 15 pulls off lighter contaminates in a cyclonic airstream allowing the remaining blast shot and entrained heavier contaminants to drop and accumulate within a grit/delivery storage area 15B as seen in broken lines in FIG. 1 and solid lines in FIG. 3 of the drawings. A double dump airlock assembly 17 has two compartmentalized dump valves 17A and 17B that selectively transfer accumulated contaminated blast shot after initial (cyclonic) separation onto a vibratory screen separator classifier 18 that selectively sorts and classifies by. screen S1 designated size openings for size selection. Screened contents at 18A are transferred to "waste" as designated large debris while smaller classified contaminates 18B pass through a screen tray S2 into a collective storage dust hopper at 20 all well known and understood within the art of vibrating screen technology available and used commercially within the industry.

Screened abrasive shot blast material and remaining entrained related contaminants (dust) at 21 are then transferred via a transport auger assembly 22 driven by a motor 22A to a material bucket elevator 23.

Figure 3:
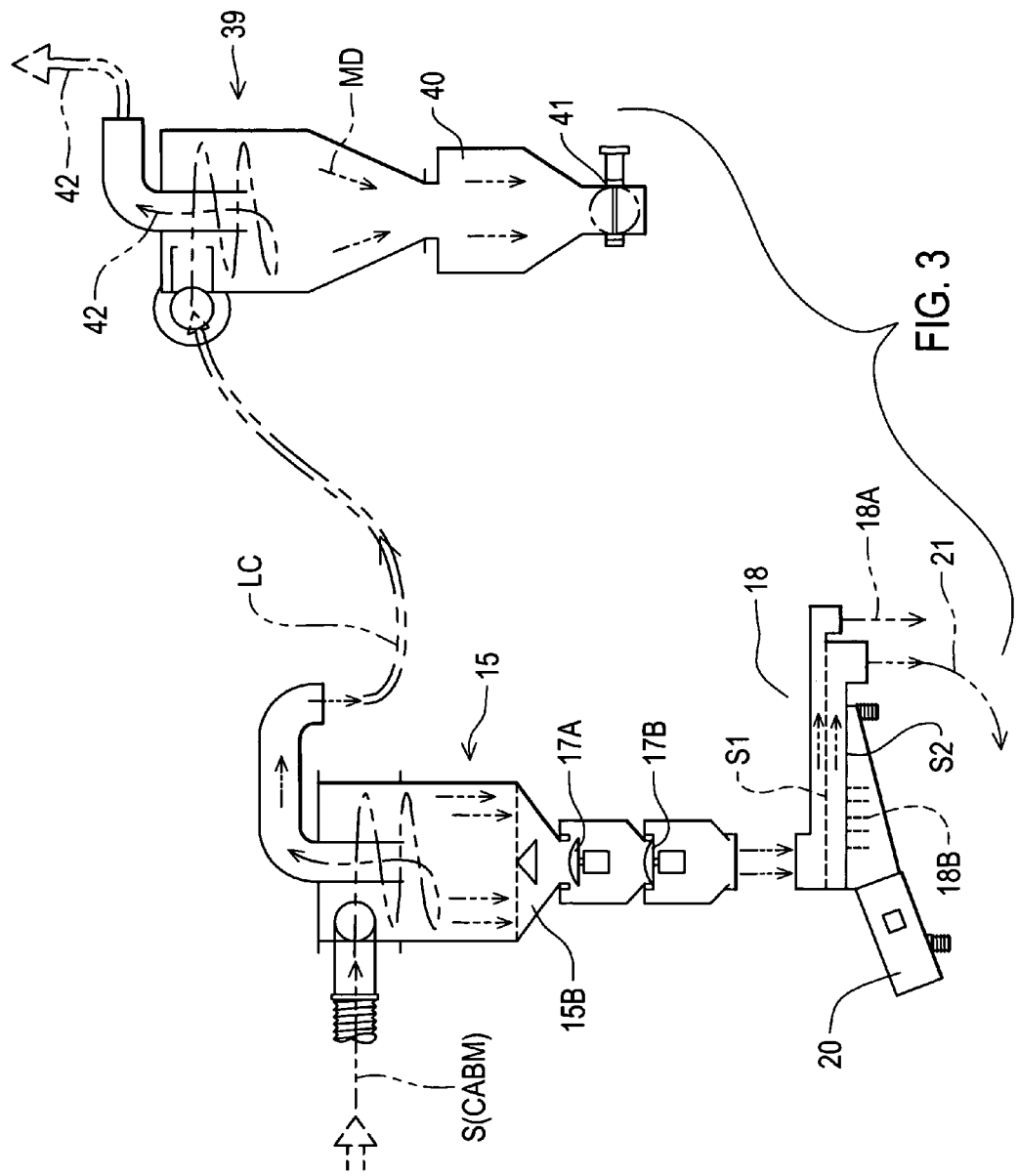
FIG. 3 is a graphic system process flow diagram of a first stage of the separation system of the invention.

The bucket elevator 23 has infeed hopper 24 receiving material from the transport auger 22 shown in broken lines and graphically in FIGS. 1-3 of the drawings. The material bucket elevator 23 has an endless belt 23A with multiple longitudinally spaced material receiving buckets 23B positioned thereon. The belt 23A is driven by a motor control assembly 25 indicated graphically and is typically found within the art of vertical transfer conveyance in the industry.

The dust contaminated blast shot material 21 is then deposited in and vertically passed through a multi-stage airwasher 26 as is well known within the art which comprises a vertical chamber 27 having multiple angularly positioned veins 27A, each of which is positioned adjacent an outside air inlet 27B to effect a specific gravity air separation of the contaminated abrasive blast material 21 is cascaded downwardly therethrough by gravity. The airwash effectively separates entrained lighter weight contaminates C including dust, forcing same upwardly through a return and removal passageway 27C to be drawn off by a first vacuum dust control system 28 comprising a low vac fan blower indicated at 29 connected to an outlet 30 of a low vac cartridge bag based dust filter assembly 31, best seen in FIG. 3 of the drawings. The low vac dust filter bag based assembly 31 has a contaminant material inlet at 31A with a plurality of dust collector filter bag cartridges 32 therewithin. An access door 33 at the top and an oppositely disposed lower chamber clean out valve 34.

A compressed air filter purge multiple nozzle assembly 35 is positioned above the hereinbefore described multiple dust filter bag cartridges 32 and is in communication with a source of compressed air SCA via a distribution manifold 36 as will be described in greater detail hereinafter and seen in FIG. 3 of the drawings.

The now cleaned and reusable blast shot material indicated at CM exits the bottom of the airwash 26 and is deposited into a combination blast "grit" storage and blast supply pot 37. The clean blast shot grit is initially held in an upper portion 37A separated by a contoured bottom 37B with a removable remotely operated material release valve 37C for releasing material therefrom into a lower blast pot portion 37D.

Referring back now to FIG. 3 of the drawings, the hereinbefore described cyclonic separator 15 which initially pulls off and separates the lighter contaminants LC through the outlet exit at 38 are transferred through a flexible hose by a vacuum source to a second "medium dirt" designated cyclonic separator 39 which by cyclonic airflow action separates "medium dirt" drops out at 39A into a holding and removal chamber 40 with access actuation valve shown at 41.

The lighter "dust" contaminant at 42 are forced upwardly and are drawn off by a second vacuum dust control system 43 comprising of a high vac three lobed air injection high vac blower 44 well understood within the art supplying a vacuum circulation through a high vac dust filter dust cartridge bag filter house 45 interconnected to the cyclonic separator 15 via a transfer hose 46 into the high vacuum pressure filter inlet 46A. The high vac dust filter cartridge bag house 45 has a plurality of dust collector filter bag cartridges 47 therein with a top access panel 48 and two lower chamber clean out valves 49A and 49B on the inlet filter side.

Figure 4:
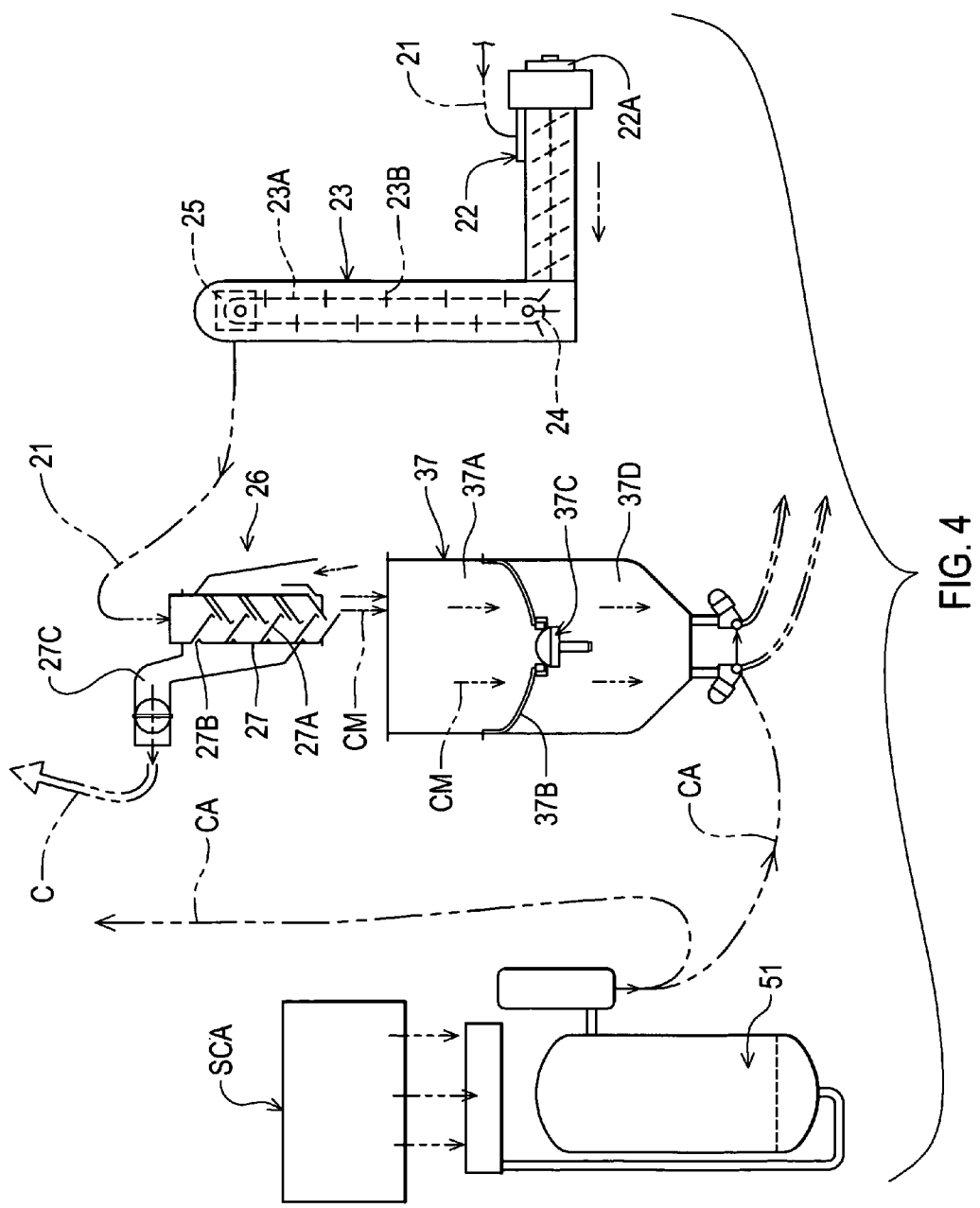
FIG. 4 is a graphic system process flow diagram of the second stage of the material separation and recovery system.
Figure 5:
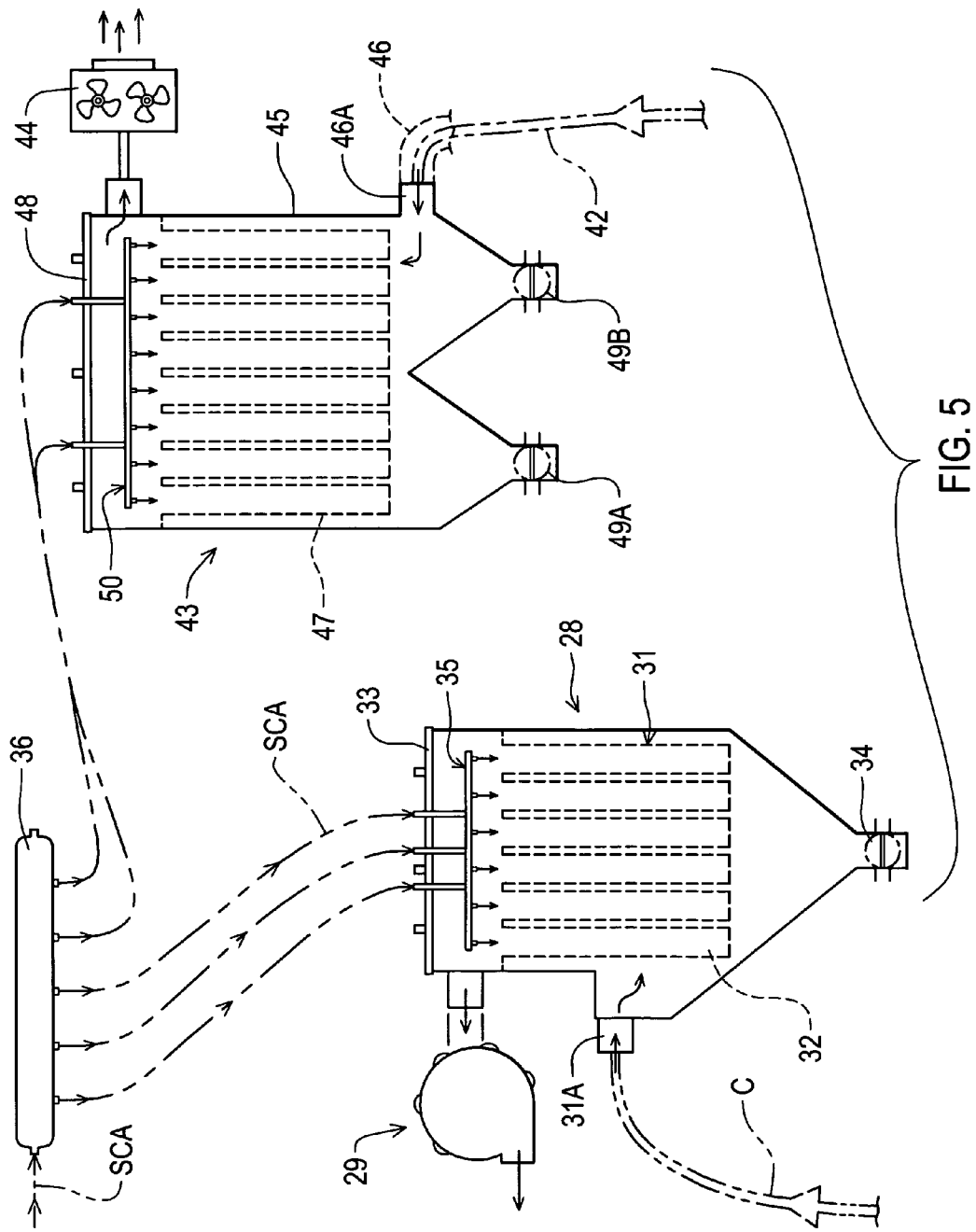

Compressed air purge nozzle assemblies 50 are positioned within the high vac dust filter bag cartridge house 45 above the respective filter bag cartridge 47 openings and are in communication with the hereinbefore described air distribution manifold 36 and a source of compressed air SCA via an on board air dryer 51 illustrated graphically in FIG. 4 of the drawings and in FIGS. 1 and 2 of the drawings. The distributing manifold 36 also supplies the air purge nozzle assembly 35 in the low vac volume dust bag house 31 as hereinbefore described. It will be evident that the respective high and low vac bag house assemblies 31 and 45 provide for easy access for bag cartridge replacement and systematic cleaning via select air pulse introduced by the air purge respective nozzle assemblies 35 and 50.

In operation, contaminated abrasive blast shot "grit" CS is collected from the work site and pulled directly into the primary first stage cyclonic separator 15 as described for the beginning of the combined self-contained mobile abrasive blast material stage separator and recycling platform process of the invention. After cleaning and separation the recycled abrasive shot blast material is drawn from the blast pot portion 37D of the grit storage and blast pot 37 for reuse via a high pressure compressed air injection at 52 as well known by those skilled in the art.

Operational activation and control is achieved through a central control panel 53 which affords user interface with the recycling system of the invention hereinbefore described. Power is supplied through the respective components depending on application requirements, in this example by a gasoline engine at 54 which is interconnected to the main blower assembly and an electrical generator 55 through a specific control panel and interface control circuitry well known and developed within the art for multiple equipment sequential stage control as is typically found in mobile oriented and power equipment.

Only the currently disclosed system 10 of the invention affords a compact mobile self-contained multiple stage separation and cleaning of contaminated abrasive blasting material in an integrated selection and separation processing system providing unique onsite abilities independent of large system separators and affording a combination contaminant removal containment and disposing with recycled clean shot blast supplied directly to attached blasting equipment indicated graphically as BE for a total work site adaption.

Thus it will be seen that a new and novel abrasive blasting separation and recycling mobile platform apparatus has been illustrated and described and it will be apparent to those skilled in the art that various changes and modifications may be made without departing from the spirit of the invention. Therefore I claim:

I claim:

1. A process for separation and recovery of contaminated abrasive blasting material wherein said process comprises the steps of,
   a. transferring contaminated abrasive blast material to a mobile self-contained separation recovering and reuse supply apparatus,
   b. separating airborne contaminants within said contaminated abrasive blast material by a first cyclonic air separator,
   c. separating airborne contaminants by a second cyclonic separator in communication with said first cyclonic air separator,
   d. transferring said airborne contaminants from said second cyclonic air separator to a high pressure dust filter media,
   e. separating contaminants from said blast material from said first cyclonic air separator by a vibratory screen separator and specific gravity,
   f. transporting said abrasive blast material separated by said vibratory screen to an airwash specific gravity separator,
   g. transporting air entrained contaminants from said airwash separator to a low pressure dust filter medium,
   h. transferring clean abrasive blast material from said airwash separator into a holding and distribution recycling reuse bin,
   i. purging said high and low pressure dust filter media by compressed air.

2. The process set forth in claim 1 wherein transferring contaminated abrasive blast material to said first and second cyclonic separators and dust filter media comprises,
   a blower in communication therewith.

3. The process set forth in claim 1 wherein transferring said abrasive blast material from said vibratory screen to said airwash separator comprises,
   material auger and elevator.

4. The process set forth in claim 1 wherein transferring air entrained contaminants from said airwash separator to said low pressure dust filter media comprises, an air blower in communication with said dust filter media.

5. The process set forth in claim 1 wherein said purging said high and low pressure dust filter media by compressed air comprises, a source of compressed air, an air dryer in communication therewith, multiple nozzle assemblies within said respective dust filter media and compressed air distribution manifold in communication therewith.

* * * * *